Figure 1:
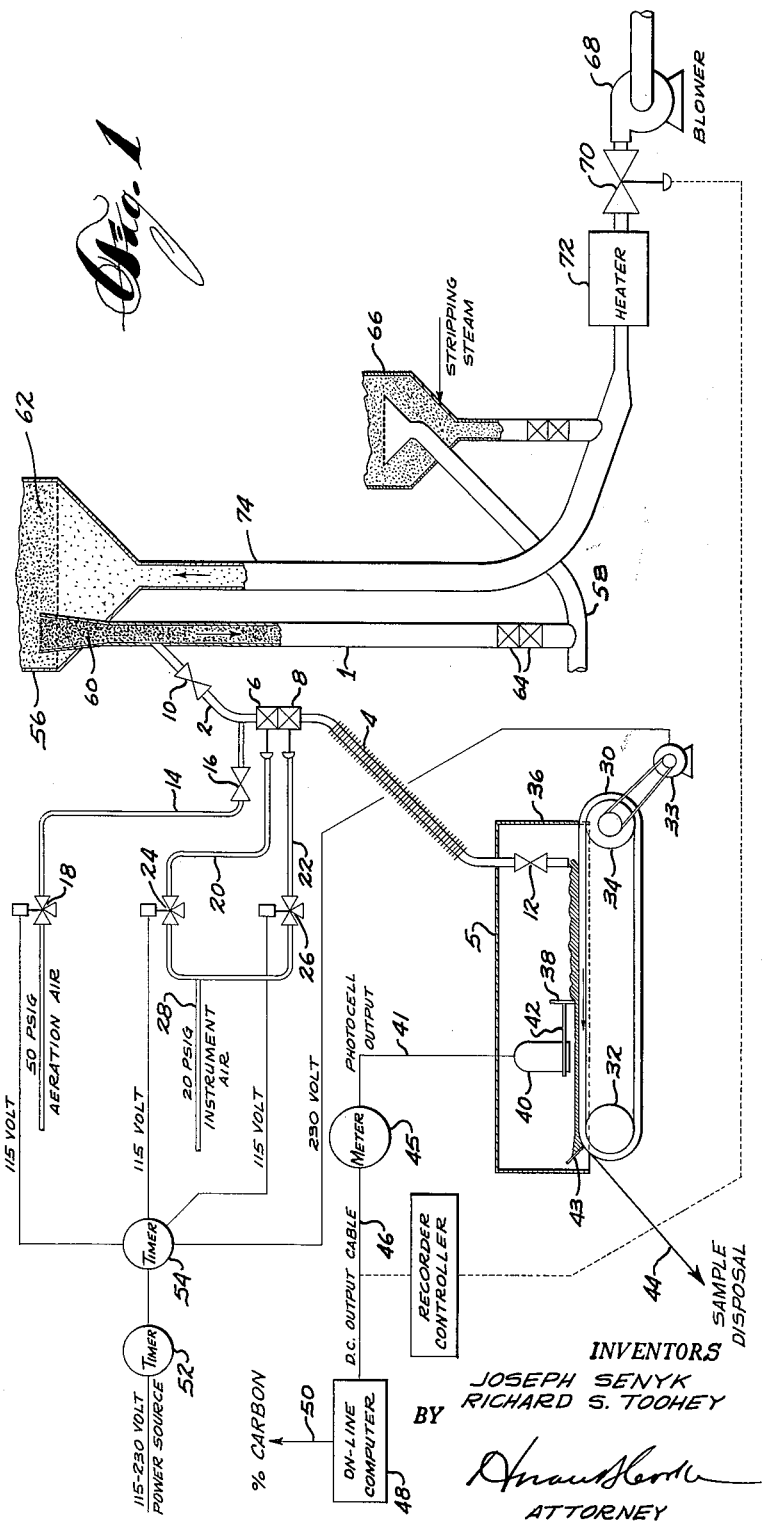

INVENTORS
JOSEPH SENYK
RICHARD S. TOOHEY
BY

ATTORNEY

United States Patent Office 3,232,711
Patented Feb. 1, 1966

3,232,711
CARBON-ON-CATALYST ANALYTIC APPARATUS
Joseph Senyk, Pittsburgh, and Richard S. Toohey, Springfield, Pa., assignors to Gulf Research & Development Company, Pittsburgh, Pa., a corporation of Delaware
Filed Aug. 17, 1962, Ser. No. 217,697
2 Claims. (Cl. 23—253)

This invention relates to the quantitative determination of catalyst carbon content, using a photometric technique, and more particularly, to on-line analysis of catalyst for carbon content and to the use of such analysis as a basis for the control of catalytic regeneration operations.

The carbon or coke content of the catalyst employed in catalytic hydrocarbon conversion processes is one of the most important parameters by which the efficiency of such conversion can be controlled, as even a relatively slight increase in the carbon content of a catalyst can result in a significant reduction in the activity and/or selectivity of such catalyst. By way of illustration, published data indicate that an increase in the carbon content of a synthetic silica-alumina cracking catalyst of as little as from one percent to 1.5 percent can result in a reduction in conversion from 65 to 63.5 percent and an increase in coke yield from about 6.66 percent to 6.74 percent, based on the feed. For a catalytic cracking unit charging 40,000 barrels per day of fresh feed, a change in the activity and selectivity of the cracking catalyst of this magnitude would mean a reduction of about 600 barrels per day of converted products, principally gasoline, as well as an outright loss of about 32 barrels per day of total products to additional coke deposition on the catalyst.

Notwithstanding the importance of the carbon content of a catalyst to the operating efficiency of catalytic hydrocarbon conversion processes, such as catalytic cracking of gas oils to gasoline, close control of such processes with respect to carbon-on-catalyst has been difficult to achieve. Thus, when catalyst carbon content is obtained by conventional laboratory methods, a considerable time may elapse under normal conditions between the withdrawal of a catalyst sample for analysis and the reporting of results. During night operation, even longer periods without analytical information as to the carbon content of the catalyst may occur, as laboratory analyses are ordinarily not obtainable at night. Consequently, a considerable loss of products may have already been suffered by the time the discovery is made that the process has been operated at less than optimum efficiency with respect to the carbon content of the catalyst.

Although it is possible during intervals in which laboratory analyses are not available to control process conditions on the basis of visual estimates of the carbon content of the catalyst, this method of operation has not proved entirely satisfactory, and in fact is inherently unreliable since even small differences in carbon content that are not normally distinguishable by visual observation can make a significant difference in results. For example, one study has indicated that an increase in carbon content of a cracking catalyst of as little as 0.05 percent could mean a loss of approximately $100 per day in a cracking unit of the size indicated above.

Automatic, rapid, on-line analysis of catalyst for carbon content has been proposed previously to alleviate the problems indicated above, but has not been found entirely satisfactory, as the analytical methods hitherto available for on-line analysis have been merely variations of relatively cumbersome laboratory methods that are not well suited for in-plant operation.

It has now been found that dependable, accurate automatic on-line analysis for carbon on catalyst can be carried out by a photometric technique, whereby close control of regenerated catalyst carbon content can be achieved, together with proportionately improved product yields from the reaction in which the regenerated catalyst is employed. The present invention, based on the above-indicated discovery, relates to a process and apparatus for quantitatively determining catalyst carbon content and for the controlling of catalytic regeneration on the basis of such determination. The present process broadly includes providing a sample of catalyst that is representative of the catalyst mass whose carbon content is to be determined and disposing the catalyst sample on a support. A uniform test surface is then formed in said catalyst sample, and this uniform surface is subjected to light radiation of known intensity. The intensity of the radiation reflected from the test surface is detected and converted to an output whose intensity is related to the carbon content of the catalyst.

The apparatus of the present invention broadly includes catalyst analysis means that include means for subjecting a catalyst sample test surface to light radiation of known intensity, and means for detecting the intensity of the light radiation reflected from such test surface and for converting the same to an output whose intensity is related to the carbon content of the catalyst sample. The apparatus also includes, in combination, sampling means interconnecting said analysis means and a source of catalyst whose carbon content is to be determined, such sampling means being adapted to convey samples of said catalyst to said analysis means. The apparatus of this invention further includes means for forming a uniform test surface in the catalyst samples conveyed to the analysis means. Although some advantages are realized from continuous operation of the analytical apparatus of this invention, the apparatus can also be operated very effectively on an intermittent basis. The apparatus therefore can also include means for periodically activating and deactivating the catalyst analysis means and the sampling means at predetermined intervals.

The method and apparatus of this invention are especially important when utilized in the control of a portion of a catalytic chemical processing operation, such as the catalyst regeneration phase, and the present invention therefore specifically includes the use of the herein-disclosed method and apparatus in such combinations.

Figure 2:
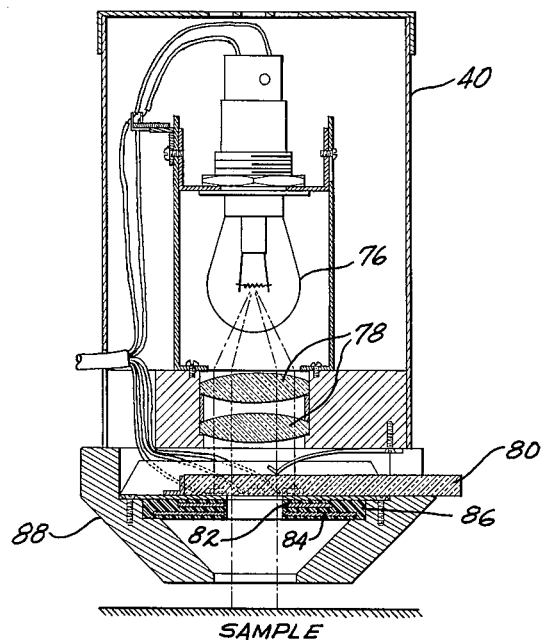
Figure 3:
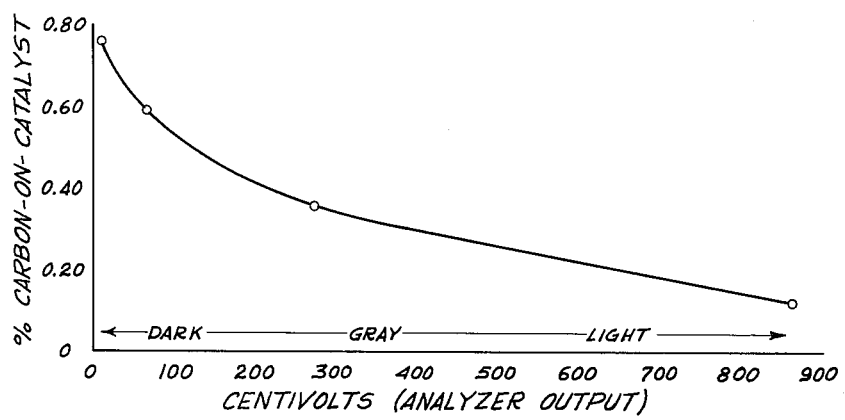

Referring now briefly to the drawings, FIGURE 1 is a schematic flow diagram of a practical embodiment of the method and apparatus of this invention. FIGURE 2 is a front elevational view, in vertical section, of a photoelectric search unit shown schematically in the embodiment of FIGURE 1. FIGURE 3 is a calibration curve relating percent carbon in catalyst to the output intensity of the search unit of FIGURES 1 and 2.

The invention can be most readily understood by further reference to the drawings. Referring now to FIGURE 1 in detail, numeral 1 denotes a catalyst standpipe, the upper portion of which is connected to a fluidized catalyst regeneration vessel 56, shown in fragment, and the bottom portion of which is connected to the feed inlet line 58 of a catalytic cracking reactor 66, shown in fragment. Standpipe 1 permits freshly regenerated catalyst 60 to flow in fluidized form from a fluidized bed 62 of catalyst that is being regenerated in the regenerating vessel 56, at a rate controlled by slide valves 64, into the feed line 58, where it is premixed with hot cracking charge stock in the desired proportion. Catalyst bed 62 is regenerated by combustion of carbon previously deposited thereon during the catalysts of hydrocarbon cracking or like reactions in vessel 66. Combustion of such carbon is effected by continuous introduction of air from blower 68, control valve 70, heater 72, and standpipe 74 into regenerator 56.

Numeral 2 refers to an upper or catalyst withdrawal section of a catalyst sample line, or bypass conduit, for withdrawing catalyst from catalyst standpipe 1 and for transporting the same to analysis means 5. Numeral 4 refers to a lower or catalyst cooling section of the catalyst sample line. Line 4 is provided with spaced fins for rapid dissipation of heat from the hot, freshly regenerated catalyst into the atmosphere, prior to passage into analysis means 5. Flow through catalyst sample lines 2 and 4 is controlled by pneumatically operated slide valves 6 and 8 and also by manually operated valves 10 and 12. Lines 2 and 4, together with control valves 6 and 8 form sampling means interconnecting a catalyst analysis means 5 and a source of freshly regenerated catalyst whose carbon content is to be analyzed.

Line 14 indicates a catalyst aeration air line for aerating catalyst in lines 2 and 4 and for clearing the catalyst sample line, whereby plugging of the catalyst sample line by a compacted mass of catalyst is avoided. Flow of aeration air for the catalyst sample line is through line 14 and is controlled by solenoid operated valve 18 and by manually operated valve 16. Slide valves 6 and 8 are operated by an auxiliary supply of instrument air delivered to the system through line 28 and to the diaphragm motors of valves 6 and 8 by lines 20 and 22, respectively. The flow of instrument air through lines 20 and 22 is regulated, respectively, by solenoid operated valves 24 and 26.

Numeral 30 refers to a conveyor belt, which is desirably formed from some heat resistant material such as steel, although heat resistant material need not be used when the cooling capacity of the catalyst cooling line is sufficiently large to prevent damage to the belt by the catalyst samples. Belt 30 forms a support on which the sample of catalyst to be analyzed can be disposed for photoelectric scanning. Numeral 34 indicates the drive roller for conveyor belt 30, and numeral 32 indicates the idler roller. Drive roller 34 is driven by electric motor 33. Roller 34 and motor 33 can be operatively associated by a drive belt, as shown, or alternatively, by a suitable gear train. Numeral 36 indicates a hood, formed from sheet metal of the like, enclosing the upper surface of the conveyor belt 30 to prevent the entrance of stray light and air circulation. Numeral 38 denotes a leveling bar attached at each end to the inside surfaces of hood 36. Bar 38 is mounted so as to provide a small clearance, say one quarter inch, between its lower surface and the upper surface of the conveyor belt 30. This bar, together with the conveyor belt 30, acts as a means for forming a uniform, smooth, planar test surface, normal to the direction of the light radiation from a source in search unit 40, in the catalyst samples disposed on the upper surface of conveyor belt 30. The action of the leveling bar on the catalyst sample prior to photoelectric scanning is very important, as the photoelectric search unit of analyzer means 5 is sensitive to changes in density of the catalyst sample and in the angle of repose of the catalyst sample.

Numeral 40 denotes the photoelectric search unit component of analysis means 5. Search unit 40 is supported by a bracket 42 mounted on the left-hand side of leveling bar 38. Numeral 43 indicates a scraper adapted to remove catalyst samples from the upper surface of belt 30 after they have been scanned by search unit 40. Catalyst so removed drops to inclined plane 44 and thence to a catalyst disposal vessel, or hopper, not shown.

Numeral 41 represents an electrical connection for conducting the electrical photocell output of the analyzer search unit 40 to the meter 45, which amplifies and visually indicates the magnitude of the intensity of such output. This output intensity is a function of the quantity of light radiation reflected from the test surface of the catalyst sample and of the amount of carbon on the catalyst sample. In the illustrated embodiment, the photocell output is electrically conducted from the meter 45 by way of D.C. output cable 46 to an on-line computer 48. Computer 48 is previously programmed with calibration information relating photocell output intensity to catalyst carbon content. The computer functions to apply the necessary scaling factor to the photocell output and converts the information thus obtained to a second, digitized output that is indicative of percent carbon on catalyst. This second output is passed through electrical conductors 50 to a logging typewriter, not shown, which in turn prints out the percent carbon on the catalyst sample.

The information obtained in the above-indicated manner can be used manually to control a variable in the catalytic regenerating process, such as the rate at which regeneration air is introduced into the regenerator, or alternatively, a variable in the catalytic conversion reaction, such as the rate at which charge stock is introduced to the reactor, so as to permit a greater or lesser quantity of carbon to remain on the regenerated catalyst, if desired. In a more complex operation, the percent carbon on catalyst as determined by the computer also can be stored by the computer for use in the over-all correlation of the process to obtain an optimum or near optimum balance of operating conditions. In an alternative operation, there can be employed instead of or in addition to the computer a conventional instrument adapted continuously to indicate and/or record the strength of the photocell output with increasing time, or a conventional controller—which can be indicating and/or recording—as shown by dashed lines, or neither, that will not only continuously monitor the strength of the photocell output signal but that also will control a predetermined process variable, such as regeneration air rate, in a predetermined manner.

Referring now to FIGURE 2 in detail, numeral 76 indicates the light source of analyzer search unit 40. Numeral 78 refers to a double condensing lens for collimating the light from source 76 in a direction normal to the upper surface of belt 30 and the test surface of the catalyst sample. Numeral 80 indicates a glass color filter, narmally green for purposes of the present invention, which is provided to compensate for the difference between the photocell response and the spectral sensitivity of the human eye as well as for the spectral difference between the incandescent light of the lamp 76 and normal daylight. Numeral 82 denotes a compensating photocell which is provided for the purpose of suppressing the zero reflection point. Numeral 84 denotes a measuring photocell which is mounted so as to register only diffusely reflected light, specularly reflected light being returned through the aperture of the photocell unit. Both measuring photocell 84 and compensating photocell 82 are embedded in a single unit 86 of transparent, polymerized plastic for full protection against atmospheric moisture and chemical vapors. Numeral 88 denotes a protective hood or light shield for the search unit.

Referring to FIGURE 3, there is shown a calibration curve relating the amplified analyzer output to percent carbon on catalyst. The mathematical relation between percent carbon on catalyst and the analyzer output is previously fed into the computer, so that the computer can then apply the proper scaling factor to the analyzer output to convert such output to a signal whose intensity is proportional to the percent carbon on catalyst. As indicated above, this signal, in turn, is digitized and fed to a logging typewriter that prints out percent coke on catalyst. Where no computer is available, the amplified analyzer output can be read from the reflectance meter and compared with a suitable calibration curve of the kind illustrated in FIGURE 3 to determine percent coke on catalyst.

In operation of the system illustrated in FIGURE 1, the over-all sampling and analytical system is actuated by schedule timer 52, which is set to operate at desired sampling intervals. Schedule timer 52 in turn actuates sequence timer 54, which in turn actuates, in the desired sequence, conveyor drive motor 33, solenoid operated valves 24 and 26 and control valves 6 and 8, and solenoid operated valve 18. With manually controlled valves 16, 10, and 12 open, freshly regenerated catalyst is withdrawn from standpipe 1, caused to pass through catalyst sample line 2, control valves 6 and 8 and through air-cooled catalyst sample line 4. Catalyst flows in the direction indicated because of a slight superatmospheric pressure in standpipe 1. The catalyst so withdrawn is then disposed on the upper surface of moving conveyor belt 30. As the catalyst sample moves beneath leveling bar 38, a smooth, planar test surface is formed in the catalyst sample. As the test surface moves beneath the scanning element of analyzer search unit 40, the light diffusely reflected from said test surface is detected and converted to an electrical output by the measuring photocell component 84 of search unit 40. This output is amplified and indicated by meter 45 and converted to percent carbon on catalyst by computer 48.

In a specific embodiment there is employed a catalyst sample line comprising an upper or sample withdrawal section approximately 8.5 feet in length and a lower portion, or catalyst sample cooling section, fabricated from a 14.5 foot length of finned steel tube having an outside diameter of one inch. The upper section of the catalyst sample line is provided with a pair of pneumatic slide valves and an aeration air line formed of one-half inch pipe, as shown. The analyzing means comprises a steel conveyor belt six inches in width mounted on a pair of rollers whose axes are spaced five feet apart. One of the conveyer rollers is driven by an explosion-proof electric motor. The search unit and reflection meter employed in this embodiment is a Photovolt photoelectric reflection meter, Model 610, containing a Model 610-Y search unit. The schedule timer is a Flexopulse continuous cycle timer having a cycle time of one hour. The cycle timer is a Polyflex reset cycle timer having a cycle time of one minute. The leveling bar is spaced approximately one-quarter inch above the upper surface of the conveyor belt and the aperture in the protective light shield of the photoelectric search unit is spaced approximately one-half inch above the upper surface of the conveyor belt.

The upper end of the catalyst sample line is connected to the regenerator standpipe that connects the lower section of the regenerator vessel with the feed inlet line of the cracking reactor. In the present embodiment the regeneration vessel contains an inventory of approximately 500 tons of fluidized semisynthetic silica-alumina cracking catalyst which is undergoing regeneration by combustion of carbon deposits thereon at a temperature of about 1150° F. Combustion is maintained in the regenerator vessel by introduction therein of 650,000 pounds per hour of undiluted air. At a preset sampling time, the schedule timer activates the cycle timer. The cycle timer in turn activates the following elements in the order named: the conveyer motor, the solenoid operated valve that controls the first pneumatic slide valve, the solenoid operated valve that controls the second pneumatic slide valve, and the solenoid operated valve that controls the aeration air. With the above-indicated, automatically operated valves in an open position, except valve 18 which is closed when energized, and with all manually controlled valves in an open position, catalyst passes from the standpipe through the withdrawal section of the catalyst sample line, through the catalyst cooling section of the catalyst sample line and onto the upper surface of the conveyer, where it is deposited in the form of mounds. A uniform test surface is formed in the non-uniformity mounded catalyst sample by the leveling bar as the catalyst is conveyed toward the search unit. As the catalyst passes beneath the search unit, diffuse light reflectance is measured and converted into percent carbon on catalyst, as described.

At the conclusion of a preset sampling period, the schedule timer switches off the sequence timer, which then resets to zero, whereby the timer-controlled valves 24 and 26 are caused to close, aeration valve 18 is opened, and the conveyer belt is switched off. Assuming a satisfactory operating level of 0.35 percent by weight carbon on catalyst, and assuming, by way of example, an observed reading of 0.40 percent by weight carbon on catalyst at a given sampling time, a slight increase in the regeneration air flow rate to the regenerator vessel, say 20,000 pounds per hour, is effected by manual adjustment of air blower control valve 70. At the next sampling time, the carbon content of the catalyst is again observed. If it has returned to the desired operating level of 0.35 percent by weight, no further adjustment will be made. On the other hand, if the percent coke on catalyst remains above the desired level, a further increase in the rate of introduction of regeneration air to the regenerator vessel will be made.

Although the invention has been particularly described in connection with the control of combustion air delivered to a combustive catalyst regeneration process, it will be understood that the herein-described process and apparatus also can be used to control other variables affecting carbon on catalyst and other types of catalyst regeneration. For example, the herein-described invention can be used to control regenerative processes in which carbon is removed by a regenerating agent other than air, e.g., hydrogen, and to control a variable in the reaction phase of the over-all process; e.g., the feed rate to a catalytic cracking operation, it being understood that lower feed rates will result in a lower carbon content on the catalyst, and vice versa, all other things remaining equal. Similarly, it will be understood that other apparatus equivalent to that shown and described can be employed. For example, in the interest of greater compactness, a turntable or the like can be employed instead of a conveyer belt. If desired, the turntable and the conveyer belt can be provided with sample retaining members to minimize the possibility of irregular distribution of catalyst sample in the region scanned by the search unit. Also, a circulating liquid-cooled catalyst sample line can be employed instead of the air-cooled finned tube catalyst sample line. If desired, cooling means can be provided for the conveyer belt or equivalent to prevent damage thereto by hot, regenerated catalyst. Such means can conveniently take the form of a circulating liquid-cooled heat exchanger in contact with the lower side of the upper surface of the conveyer belt.

The terms "carbon" and "coke" are used herein in their conventional sense as applied to catalyst deposits. These deposits are predominantly carbon, but also contain a substantial proportion of hydrogen and minor proportions of sulfur and nitrogen.

Numerous modifications of the invention other than those shown and described herein will occur to those skilled in the art, and such modifications can be resorted to without departing from the spirit of scope of the invention. Accordingly, only such limitations should be imposed as are indicated in the appended claims.

We claim:

1. Apparatus for determining the carbon content of regenerated catalyst in a moving bed, catalyst regenerating system for regenerating catalyst by combustion of carbon deposited thereon during a previous reaction cycle, comprising catalyst sampling means for withdrawing catalyst samples from the catalyst regenerating system, including a catalyst sampling conduit having an inlet end and an outlet end, said conduit being connected at its inlet end to the catalyst regenerating system for receiving a flow of regenerated catalyst therefrom, said conduit communicating at its outlet end with a catalyst analysis means, cooling means operatively connected with said conduit intermediate of said inlet and outlet ends for dissipating heat from hot, regenerated catalyst contained in said conduit, valve means positioned in said conduit for controlling flow of catalyst therethrough, said catalyst analysis means including support means for supporting samples of catalyst discharged from the outlet end of said conduit, means for forming a uniform test surface in catalyst samples, means for subjecting catalyst sample test surfaces to light radiation of known intensity, light shield means for preventing exposure of said sample test surfaces to external light radiation, said means enclosing at least the portion of said support means that supports the sample test surfaces and means for detecting the intensity of light radiation reflected only from said test surfaces and for converting the same to an output whose intensity is related to the carbon content of said catalyst samples, sequence controlling means for actuating the valve means positioned in said catalyst sampling conduit and for actuating said catalyst analysis means at predetermined times.

2. The apparatus of claim 1, including in combination a catalyst aerating conduit for aerating catalyst in said catalyst sampling conduit, said catalyst aerating conduit being connected at one end to a source of aerating gas and at the other end to said catalyst sampling conduit, valve means positioned in said catalyst aerating conduit for controlling flow of aerating gas therethrough, said valve means being actuated by said sequence controlling means at predetermined times.

References Cited by the Examiner

UNITED STATES PATENTS

| | | | |
|---|---|---|---|
| 1,471,342 | 10/1923 | Logan | 23—253 |
| 1,746,525 | 2/1930 | Darrah. | |
| 1,794,222 | 2/1931 | Whitney. | |
| 2,287,808 | 6/1942 | Lehde | 88—14 |
| 2,680,989 | 6/1954 | Savitzky et al. | |
| 2,753,246 | 7/1956 | Shields et al. | 252—419 |
| 2,797,335 | 6/1957 | Hall | 250—218 X |
| 2,984,542 | 5/1961 | Kleiber | 23—230 X |
| 3,077,746 | 2/1963 | Gans | 23—253 X |

MORRIS O. WOLK, *Primary Examiner.*

ALPHONSO D. SULLIVAN, *Examiner.*